United States Patent

[11] 3,584,973

| [72] | Inventor | Sotiris Lambiris<br>Lawrenceville, N.J. |
|---|---|---|
| [21] | Appl. No. | 862,391 |
| [22] | Filed | Sept. 30, 1969 |
| [45] | Patented | June 15, 1971 |
| [73] | Assignee | Ingersoll-Rand Company<br>New York, N.Y. |

[54] MODULAR TURBO COMPRESSOR UNIT
18 Claims, 4 Drawing Figs.

[52] U.S. Cl. .................................................. 417/13,
417/22, 417/409, 417/47, 308/9, 415/113,
415/219
[51] Int. Cl. ...................................................... F04b 49/10,
F04b 17/00, F04b 35/00
[50] Field of Search ............................................... 417/13, 22,
405, 406, 409, 407, 408, 47; 308/9; 415/113, 176

[56] References Cited
UNITED STATES PATENTS

| 2,858,173 | 10/1958 | Leibach | 308/9 |
|---|---|---|---|
| 3,015,523 | 1/1962 | Semar | 308/9 |
| 3,303,994 | 2/1967 | Morooka | 417/409X |
| 3,478,731 | 11/1969 | Morton et al. | 417/13X |

*Primary Examiner*—Carlton R. Croyle
*Assistant Examiner*—R. E. Gluck
*Attorneys*—Carl R. Horten, David W. Tibbott and Bernard J. Murphy

ABSTRACT: A turbine-compressor unit of modular construction, incorporating a cooler for intercooling and/or aftercooling, and a "packaged" system of a plurality of serially coupled units. The novel unit gas sealing, employing the very gaseous medium being compressed for this purpose, and deploys resiliently constrained bearings for the compressor shaft.

INVENTOR
SOTIRIS LAMBIRIS
BY
Bernard J. Murphy
AGENT

INVENTOR
*SOTIRIS LAMBIRIS*
BY
AGENT

MODULAR TURBO COMPRESSOR UNIT

This invention pertains to turbine-compressor modular units, and in particular to such units incorporating a cooler in the unitized structure, gas sealing, and resiliently constrained, compressor shaft bearings.

Turbine compressors common in the prior state of the art employ mainly (1) fixed journal bearings, oil and/or grease lubricated; (2) thrust bearings, oil and/or grease lubricated; (3) wet seals at either side(s) of the impeller chamber(s); (4) geared and/or other power transmission coupling between the driving turbine, or other type of prime mover and the compressor impeller shaft; (5) separate or externalized heat exchanger units for precooling (or intercooling or aftercooling) the compressed gas product; and (6) separate impeller wheel(s) attached in various ways to the impeller shaft.

Fixed journal bearings, and/or ordinary spring-mounted bearings lubricated by oil and/or packed grease, complicate shaft sealing problems thereat, require large installation and mounting space, invite inordinate bearing wear and are not suitable for use at high shaft rotational speeds.

Known thrust bearings and/or other thrust balance devices exhibit similar disadvantages, like those arising from fixed journal bearings, and also add to the machine design complexity of a high-speed compressor unit.

Wet seals are not inefficient; however, their use requires the deployment of an oil-(or other liquid) sealing system, consisting of piping, pumps, liquid reservoirs for the sealing liquid, and the like. Also the finely dispersed sealing liquid must thereafter be separated from the compressed gas product. Such ancillary components and liquid gas separation apparatus substantially add to the cost of both fabrication and maintenance.

Geared and/or other type of power transmission coupling systems usually require a large number of journal bearings and also a greater number of other mechanical components that are subject to failure and wear like that arising from a wet sealing system: fixed journal bearings, prior art thrust bearings, etc.; these escalate the cost of manufacture and repair, and also reduce the overall compressor unit reliability.

The use of a separate intercooler or aftercooler heat exchanger unit necessarily requires the manipulation of two or more units, compressor and heat exchanger, when installing a system, and involves the attendant problems of measuring an coupling interconnecting conduits therebetween.

It is an overall object of this invention to provide an improved turbine-compressor unit which avoids the disadvantages of the prior art and which incorporates ingenious features to bring about a novel and unique design of a high rotational speed, compact and efficient turbine-compressor unit combining, under one casing, turbine drive, compressor, and aftercooler and/or intercooler—when the latter is disposed between modules.

It is another object of the invention to provide an improved turbine compressor unit which avoids the use of wet sealing.

Another object is to provide an improved turbo compressor unit which employs minute "leakage" portions of the very gaseous medium being compressed to seal the unit.

Yet another object is to provide a total, modular unit of compressor and heat exchanger in a sole, installable packaged system.

A feature of this invention comprises the use of compressor journal bearings, lubricated only by the very gas being compressed by the unit. These bearings are flexibly mounted on main, rigid, structural supports. The mounting flexibility can be adjusted to provide a stable running clearance between the set running surfaces and the shaft surfaces. Within the running clearance a film of compressed gas is admitted to provide necessary lubrication action. The pressure and temperature of the gas within the bearing compartment is regulated, by system control means, to be optimum in accordance with requirements of stable and smooth bearing operation.

Further, the features of this invention comprise turbine thrust bearings capable of self-adjustment and the balancing of a steady, and/or transient, axial thrust force in either the normal or opposite direction. The turbine thrust bearings, in the preferred embodiment operate with superheated steam. However, the teaching of my invention invites the use of any other gas if required. Steam is the only medium of transfer of forces between said thrust bearings and complementary surfaces on the rotor, and it also provides the necessary lubrication for the bearing surfaces.

Another feature of this invention comprises a turbine wheel disc which provides the surface of interaction between thrust bearing forces and the turbine-compressor rotor assembly. A controlled running clearance is permitted between this surface and the thrust bearing surfaces. This running clearance is filled with a controlled amount of flow of superheated steam, to transmit thrust forces from the rotor assembly to the thrust bearings. This flow of steam also lubricates the turbine wheel thrust bearing surfaces.

In another feature of this invention, I teach the use of dry seals, which accommodate a controlled minute amount of gas "leakage" between stages and also controlled minute external "leakage" of the very gaseous medium, to completely seal the high pressure compressed gas from the low pressure surrounding environment. Further, the external "leakage" gas can be separated, filtered, cleaned, and undergo any other appropriate treatment, and be returned to the main gas stream in a closed loop.

This invention also features the use of an integrally machined shaft and three impeller wheels. This structural technique eliminates separate impeller wheel attachment devices, avoids problems which would otherwise arise from stress areas at the "attachment" locations, and provides a design capable of high rotational shaft speed, the high speed being required to achieve higher compression efficiency. Integral machining also provides the facility of a design with small optimum clearance between the shroud contours which are formed in the static nonrotating parts of the unit.

My invention comprises a direct coupling of the turbine to the impeller shaft, to form a stiff rotor assembly which requires no gears, and is able to rotate at high rotational speeds.

My invention features a unique and compact design of static structural parts which form efficient internal flow passages for superheated steam to:

a. drive the turbine,
b. supply steam to the thrust bearings,
c. supply an alternative passage for steam to the thrust bearings and thus increase reliability of thrust bearing operation, and
d. provide supply of steam for preheating vital structural and rotating components for smooth start up of the unit.

Further, my invention features a unique and compact design of structural parts which form efficient internal passages for the flow of the compressed gas from inlet through the impeller(s) of the rotor and, subsequently, after compression, through the cooler to the delivery port.

Still further, my novel modular turbine-compressor unit teaches a construction that accommodates the assembly together of a plurality of such units, with limited, additional piping or other conduits, and the assembled plurality having a common control system for startup, normal operation, and emergency shutdown.

Further objects and features of this invention will become more apparent by reference to the following discussion, taken in conjunction with the accompanying (figures in which.

Figure 1:
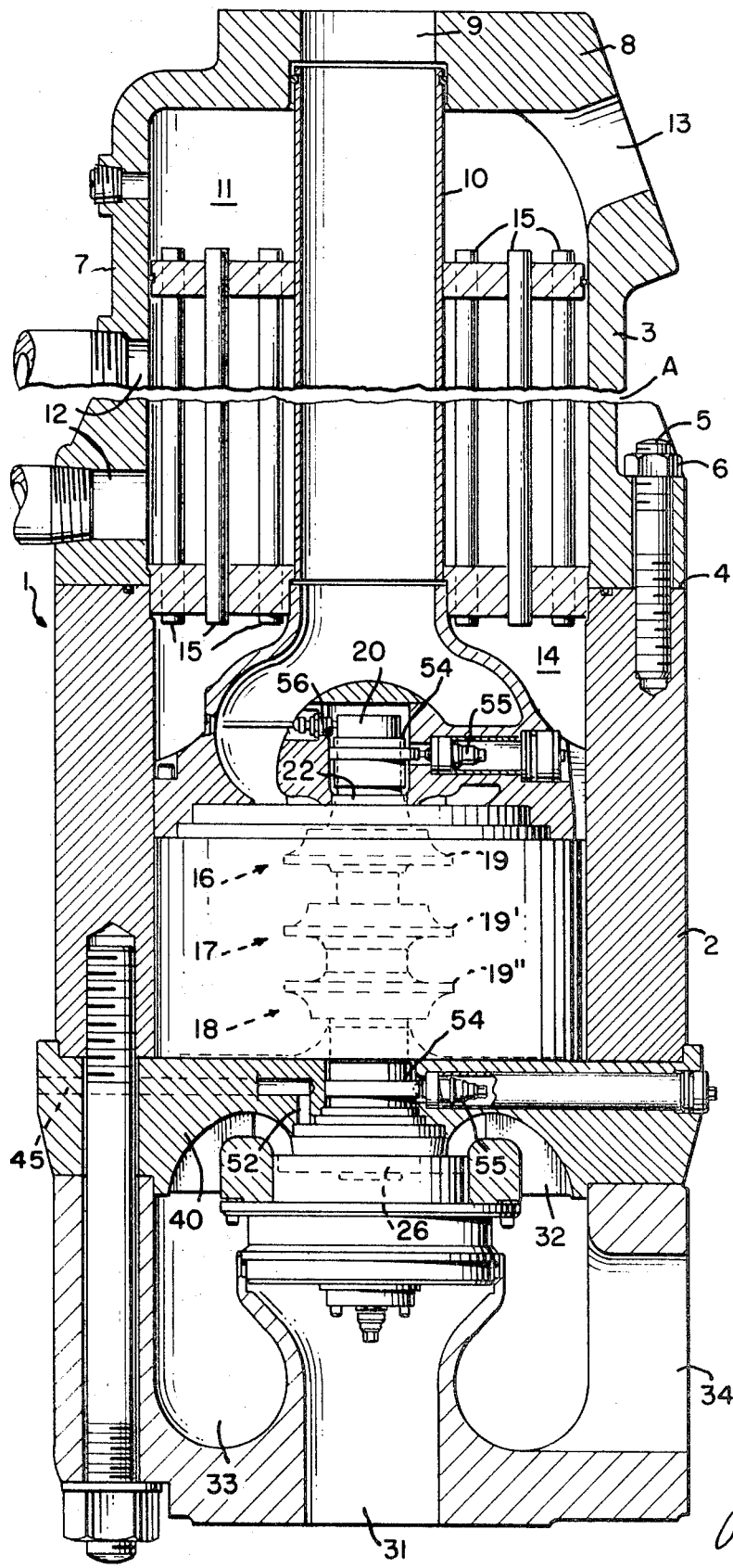
FIG. 1 is a longitudinal, cross-sectional view of the turbine-compressor assembly, of modular construction, according to the invention, shown in vertical disposition, broken at A midway along the heat exchanger.
Figure 2:
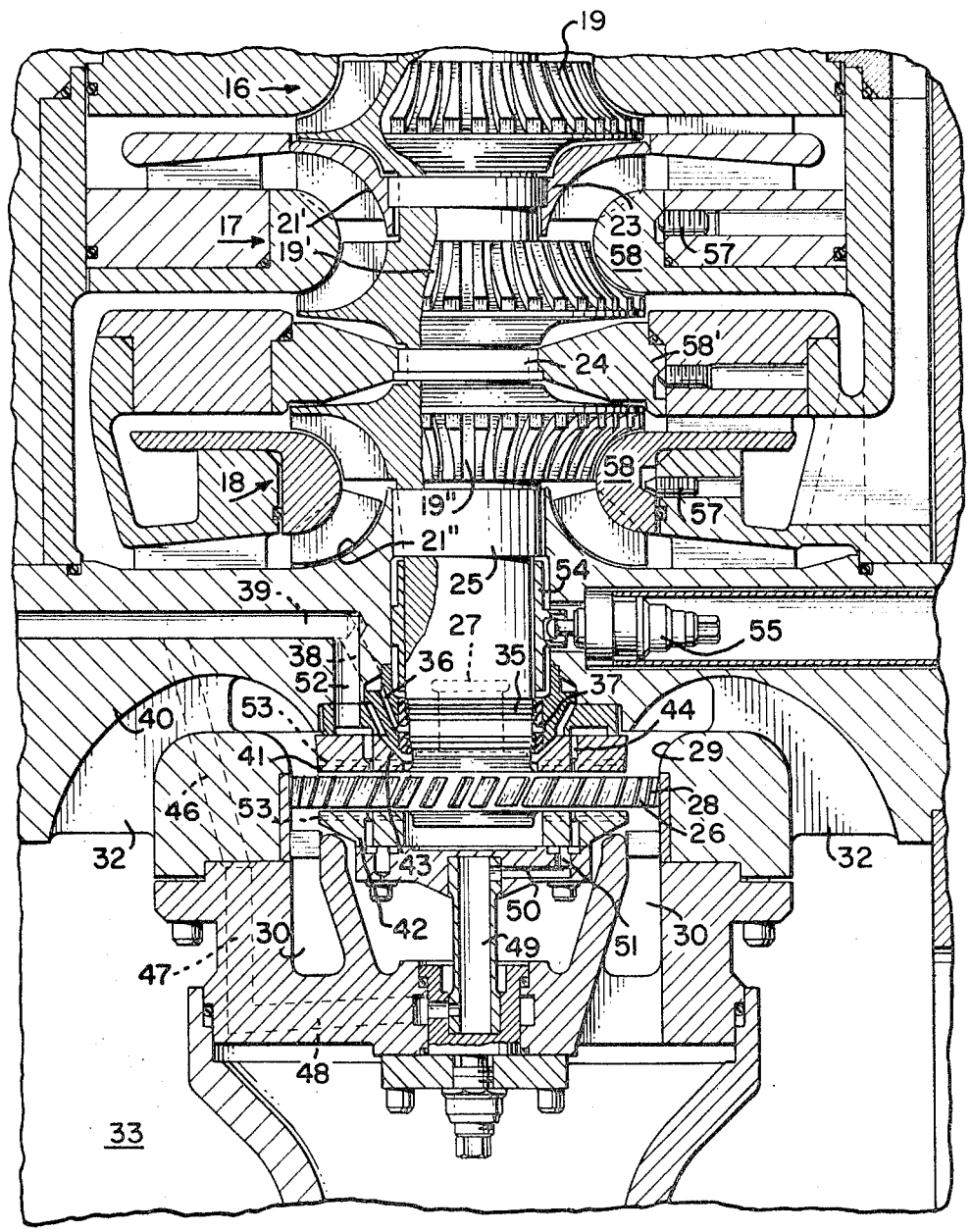
FIG. 2 is an enlarged view of a portion of the FIG. 1 assembly, the portion being the turbine-compressor interface area.

As shown in FIGS. 1 and 2, my modular, improved turbine-compressor assembly 1 comprises a compressor 2 and heat exchanger 3 coupled together at 4 by studs 5 and nuts 6.

Exchanger 3 comprises a housing 7 with a terminal end portion 8 having a gas inlet port 9 formed therein. Exchanger 3 confines an axially extending, centrally disposed gas inlet pipe 10 for conducting gas to the compressor) within an encompassing coolant chamber 11. Ports 12 formed in housing 7 admit coolant to and evacuate coolant from the exchanger 3.

A port 13 releases the cooled, compressed gas product from exchanger 3, while annular pocket 14 constitutes the gas inlet to exchanger 3. Tubes 15 channel the gas through coolant chamber 11.

My novel compressor assembly 2, only by way of example, incorporates three compressor stages: first stage 16, second stage 17, and third stage 18. Each stage comprises an impeller 19, 19', 19'', rotatable, with shaft 20, in a chamber 21, 21', 21''. To each side of each chamber–relative the shaft axis–are disposed labyrinth seals 22, 23, 24, and 25. Seals 22—25 accommodate a minute leakage of gas therealong and substantially prohibit the intercommunication of chambers 21, 21', 21'' with one another.

A turbine 26 is directly coupled to shaft 20 at 27 and carries vanes 28 rotatably in a steam volute 29. Nozzles 30 address the powering steam, admitted via steam inlet port 31, to the vanes 28. Expended steam is vented by way of volute 32, chamber 33, and port 34.

Shaft 20 has a dual labyrinth seal 35 about the steam-inlet end thereof. Seal 35 has a diagonal passageway 36 formed therethrough which communicates internally with an annular gas leakage chamber 37 about shaft 20 and externally with scavenge conduits 38 and 29 formed in a housing bulkhead 40. Seal 35 is also spaced from a steam-borne, thrust ring 41. Ring 41 interfaces turbine 26 at one axial side thereof, and a fixed, wear ring 42 interfaces the other side of said turbine 26. Spacing between ring 41 and seal 35 defines a steam-cushioned, tapered, annular chamber 43 within which ring 4 can exhibit movement relative to the axis of shaft 20.

Rings 41 and 42 each have fine axially extending ports 44 formed therethrough which are supplied with thrust bearing steam via a system of conduits 45 through 52, the first of which, 45, opens externally of bulkhead 40. The supplied thrust-bearing steam counters residual thrust from stages 16—18 and provides a minute film of steam between turbine 26 and rings 41 and 42. Also, the supplied thrust-bearing steam "floats" ring 41 relative to the face of turbine 26 with which it is interfaced. Expended thrust-bearing steam is vented through scavenge conduits 53 drilled radially through rings 41 and 42.

Journal bearings 54 at either ends of shaft 20 are resiliently supported, to accommodate movement thereof in response to shaft eccentricity, by adjustable, spring-loaded, restrainers 55.

An electrical speed or r. p.m. sensor 56 is disposed at the terminal end of shaft 20 and (by means not shown in FIG. 1) is coupled to a supervisory panel (not shown) which automatically regulates the rate of steam input. Finally, adjustable dowels 57 are interposed in recesses in the stage walls 58, 58' for altering the clearance between the impeller blades and walls.

Figure 3:
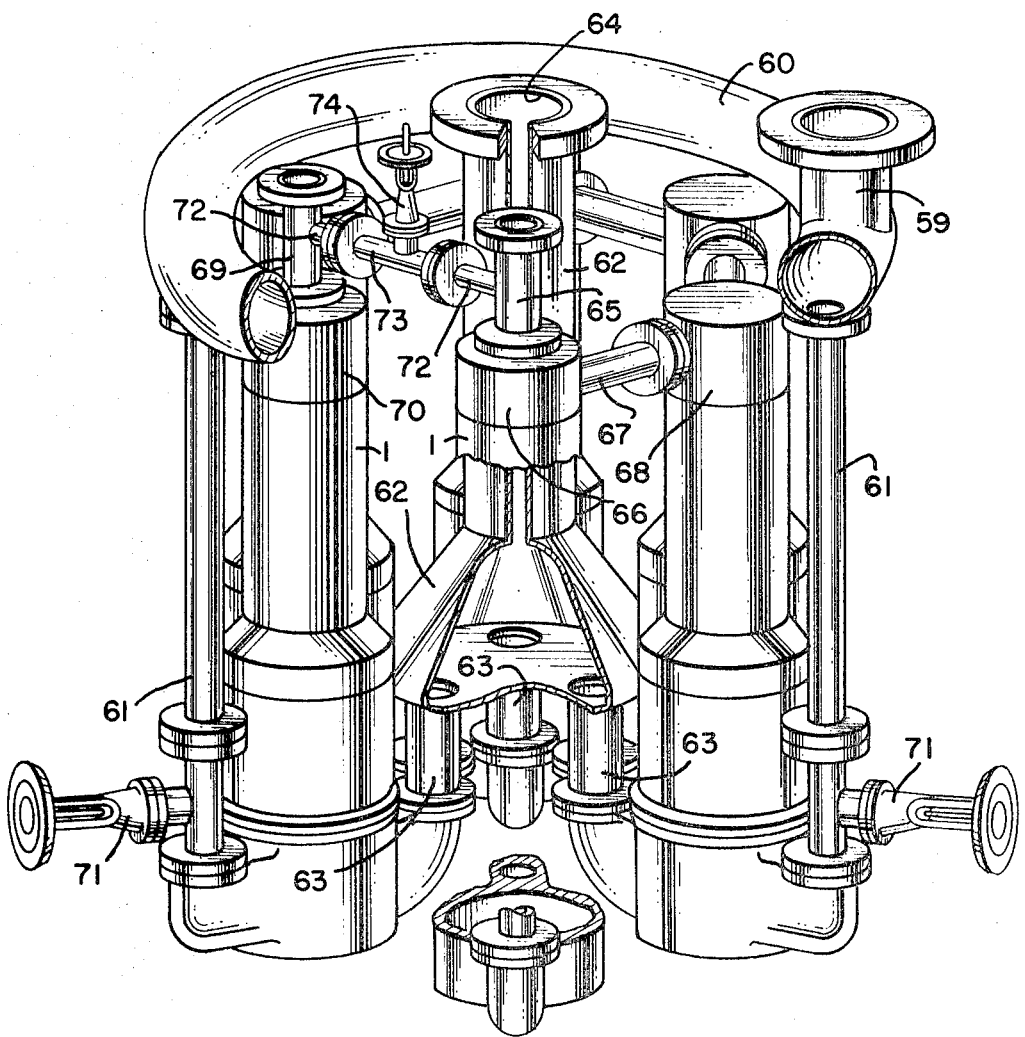
FIG. 3 is an isometric view of a "packaged" system of six of the modular assemblies of FIG. 1.

In FIG. 3 are shown six turbine-compressor assemblies 1 manifolded together into a "packaged" system. A flanged steam input pipe 59 extends from a closed loop, circular conduit 60 for uniform distribution of steam therethrough and to the six assembly-steam-input pipes 61. A steam exhaust manifold 62 receives spent steam from the assemblies, via exhaust pipes 63, and passes it to a flange steam output pipe 64.

A common gas inlet tube 65, for supplying gas to a first assembly 66, ultimately serves the entire system. This is so as first assembly 66 communicates its compressed gas product, via a linking pipe 67, to a second assembly 68. Further linking pipes 67—there being five in all—serially couple each successive assembly to the preceding assembly. Finally, the compressed gas product of the "packaged" system is taken from the flanged gas outlet tube 69 of the sixth assembly 70.

Figure 4:
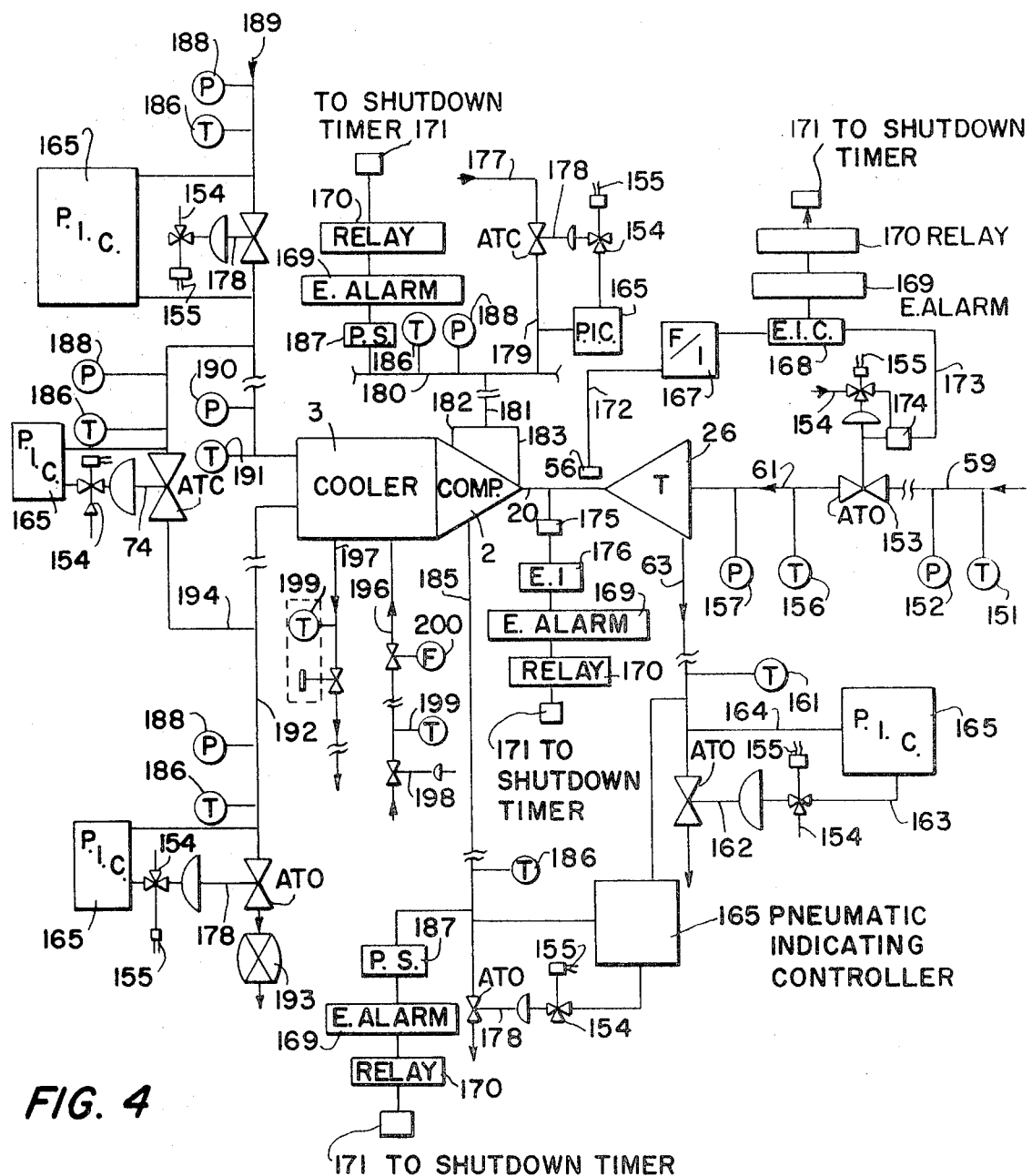
FIG. 4 is a schematic diagram illustrative of the control system, according to the invention, used to control the operation of the individual assemblies and the overall system.

Inlet steam temperature and pressure, for each assembly, is thieved by pickups 71 (only two of which are shown for signal communication to visual indicators (which are discussed in connection with FIG. 4). Further, a pair of oppositely disposed pipe tees 72, coupled via a third tee 73, provide for communication of the inlet of assembly 66 with the outlet of assembly 70. This path is normally closed by a valve 74 (of which more is explained in connection with FIG. 4); valve 74 is operable, however, to bypass the system, and reinsert the gas into assembly 66.

A turbine assembly and system, according to the invention, requires an overall control subsystem that will assure:

a. Smooth startup and normal operation,
b. Quick reaction during a malfunction leading to a safe and orderly shutdown of the unit, and
c. An automatic location and display of system malfunctions for quick assembly repair and a return to normal operation.

The most damaging situation for the system arises when any one of the six turbine rotors of the turbine-compressor assemblies overspeeds. Such overspeed may result from a sudden loss of inlet gas for the modular turbine-compressor assemblies while the supply of steam to the turbines continues at normal rates. Because of stress considerations in both turbine and compressor discs or rotors, such overspeed has to be controlled to within 5 percent to 10 percent of normal design speed for each individual assembly of the system.

Another detrimental situation to be avoided is the introduction of gas into the steam system. A positive control which monitors the seal vent pressure at the turbine end of each module is therefore required. This pressure has to remain below the steam turbine back pressure during normal operation. Leakage of gas into the steam stream may induce hydrogen embrittlement (cracking) failures in the material of the highly stressed turbine rotor and also may present an explosion hazard in the steam exhaust system, especially if the leakage rate of gas increases.

During startup of the unit, it is required to evacuate air trapped within the idle unit. This may be done by using a vacuum pump, or by purging with nitrogen (or some inert gas). A smooth transition from such a nitrogen purge to feed gas flow is then required to avoid hazardous conditions. Hazardous conditions exist if feed gas and air mixture exist within the system.

During normal or emergency shutdown, a proper sequence for cutting off steam and feed gas supplies must be observed to avoid damage of parts during this operation. Immediately after the system comes to rest after a shutdown, all modular assemblies must be evacuated, or purged with nitrogen to eliminate explosion hazards from the idle system.

The control subsystem of the invention, which accommodates for all these contingencies, is separated into the following sections:

Steam flow control,
Product gas control, and
Auxiliary flow control. These sections are described in the following text, with reference to FIG. 4, a schematic diagram of the novel control subsystem.

The control subsystem provides means for handling the steam, the sealing gas, the product gas, and the coolant, and includes a steam input pipe 59 to which are coupled a temperature gauge 151 and pressure gauge 152. Gauges 151 and 152 provide for sight reading of the condition of the steam supplied to the system. The break in pipe 59 signifies the coupling of the common system inlet to the several assemblies of turbine-compressor units. An air-operated, solenoid, throttle valve 153 is operated by air line 154 and has electrical leads 155, for enabling the solenoid, connected thereto. The steam inlet, on the assembly leg thereof, also has an "assembly" temperature gauge 156 and an "assembly" pressure gauge 157 coupled to the assembly steam input pipe 61. These gauges are supplied by pickups 71 (FIG. 3). The turbine 26 receives the steam, deriving motive power therefrom, and the steam passes therefrom into the assembly steam exhaust pipes 63. Pipes 63 have temperature gauges 161 providing for sight reading of the temperature of the exhausting steam. Each pipe 63 also has a solenoid valve interposed in the line to control the volume of steam exhaust. Valve 162 is signal controlled by control line 163; an adjacently coupled sampling line 164 samples a portion of the exhaust steam for a pneumatic indicating controller 165. The controller is provided to vary the amount of steam issuing through pipe 63, passing throttling signals to valve 162, via line 163, for this purpose. Also associated with the steam control section of the subsystem is a sensor 56 for measuring shaft r.p.m. The sensor 56 gauges the frequency of rotation of the shaft and communicates this to frequency-to-current converter 167 via line 172. The converter 167 supplies an electrical current or signal to an electric indicating controller 168; controller 168, in turn, supplies the signal to a sensory alarm 169, a relay 170 and, sequentially, to a shut-down timer 171. The operation of these components provide for the shutdown of the system if the shaft r.p.m. is excessive for a given period to time. Also these components supply a signal of the shaft r.p.m. to a comparator 174 which compares the r.p.m. signal with the flow of steam at the inlet, and causes valve 153 to throttle the inflow as necessary.

An additional shaft overspeed control system (not shown) can be used to monitor and control only the shaft r.p.m. and provide orderly shut down of the assembly if the shaft r.p.m. is excessive. This option contemplates the use of components similar to those just described, but it would be simpler in that it would not regulate the steam inflow volume through valve 153. The subsystem schematically presented in FIG. 4, a preferred embodiment, provides a sensor 175 which measures the excursions to the compressor-turbine shaft. Sensor 175 supplies a signal to an electronic indicator 176 which, in turn, is coupled to a sensory alarm 169, relay 170, and shut-down timer 171 which components function in the same manner as the like numbered components which priorly have been described, except that they are responsive to deviations from acceptable shaft excursion parameters.

Gas is admitted to the bearing compartments to provide "lubricant" b—i.e., dry gas as a lubricant medium—between the shell of the bearings 54 and the O.D. of the shaft 20. The subsystem provides means for monitoring the lubricant gas pressure while supplying the gas for lubrication of the bearings 54 and for sealing the compressor stages 16—18.

A sealing gas inlet 177 provides a supply of gas to a valve 178 for communication with the bearing compartments and the seals of the compressor. A sealing gauge feedline 179 is coupled to a trunk line 180 from which a branch line 181 extends and supplies two compressor gas injection lines 182 and 183. The compressor 184 receives this sealing gas, and gas leakage passes from the compressor to line 185 for exhaust. Scavenge conduits 38 and 39 (FIG. 2) communicate with line 185. Temperature gauge 186 is disposed in line 185 for sight reading of the exhausting sealing gas temperature. Pressure switch 187 is also coupled to line 185, and to a sensory alarm 169, a relay 170, and a shutdown 171. Here too, if bearing compartment pressures or temperatures, or gas sealing pressures or temperatures, depart from acceptable parameters, and defy an automatic corrective adjustment by controllers 165 and valves 178 at the inlet and exhaust legs of the sealing gas supply conduits, then shutdown of the system will automatically occur One or both of the switches 187, alarms 169, and relays 170 will operate the shutdown timer 171 to bring the whole system to halt.

The control subsystem includes a product gas inlet line 189, to which assembly pressure and temperature sight gauges are coupled, which feeds the gas to the compressor 2. A product gas outlet line 192 conducts the compressed gas from compressor 2 through a check valve 193. A recycling line 194, comprising pipe Tees 72 and 73, FIG. 3, is provided for reinserting the outlet gas into the compressor when, as at starting-up, the turbine-compressor has not achieved sufficient speed to provide an acceptably compressed product. This is accomplished through valve 74 and its associated pneumatic indicating controller 165. The pneumatic indicating controller 165 is coupled (by means not shown) to controller 165'; as a consequence, the latter's associated valve 178 will throttle the input until the recycling feed gas is sufficiently compressed Accordingly, the pneumatic indicating controller 165 coupled to the recycling line 194 will open the associated valve 74 to permit the gas reinsertion, while the controller 165 and associated valve 178 in the outlet line 192 hold that line closed.

The heat exchanger 3, or cooler, receives the gas therethrough, as discussed in connection with FIGS. 1 and 2, and has a coolant inlet line 196 and an outlet line 197 for passing a coolant supply thereto and therefrom. Line 196 has a hand throttling valve 198, a temperature sight gauge 199, and a flowmeter 200.

My system contemplates the use of a control panel (not shown) whereat the several sight gauges, sensory alarms, pneumatic indicating controllers, and the shutdown timers would be monitored. In practice, the several timers could comprise a single unit having several inputs. So also, the controllers can be embodied in a sole unit capable of monitoring the many system parameters. In FIG. 1, I show the location of but one of the several control subsystem sensors, sensor 56. This is done only by way of example; the same is true of the incorporation of pickups 71 and valve 74, in FIG. 3. These are illustrated to typify the manner of marrying the FIG. 4 subsystem to the basic assembly or "package" unit. Further, steam and gas inlet and outlet piping and manifolding, as between the Figures, show small variations which are occasioned only for purpose of accommodating six assemblies into a modularized "package." These variations are considered to be within the ken of those skilled in this art and, for that reason, are not discussed at length herein. Accordingly, while I have described my invention in connection with specific embodiments thereof, it is to be clearly understood that this is done only by way of example, and not as a limitation to the scope of my invention as set forth in the objects thereof.

What I claim is:

1. A turbine-compressor assembly comprising:
a housing;
said housing having a steam-powered turbine rotatively mounted therein;
a gas compressor directly coupled to said turbine for rotation therewith;
said compressor having a plurality of compressor stages;
said stages each comprising an impeller wheel integral with a compressor shaft, and rotatable within a shroud formed of said housing;
journal bearings resiliently mounted to said housing and supporting said shaft for rotation;
means providing dry lubricant to said bearings within given pressure parameters;
and means providing for adjustment of the resilience of said bearing mountings.

2. A turbine-compressor assembly, according to claim 1, further comprising:
means providing for selective adjustment of the clearance of said wheel relative to an adjacent wall of said shroud.

3. A turbine-compressor assembly, according to claim 2, further including:
labyrinth-sealing means for closing off said stages from gas communication therebetween.

4. A turbine-compressor assembly, according to claim 3, wherein:
said sealing means comprises dry seals having means accommodating minute amounts of gas leakage therealong.

5. A turbine-compressor assembly, according to claim 4, further comprising:
means for venting said leakage from said housing.

6. A turbine-compressor assembly, according to claim 5, further including:
   means for admitting steam to said turbine for the powering thereof;
   means for exhausting spent steam from said turbine;
   a thrust bearing means interfacing said turbine; and
   means for admitting a quantity of steam to said thrust bearing means for establishing a controlled running clearance between said thrust bearing means, said housing, and said turbine.

7. A turbine-compressor assembly, according to claim 6, further including:
   means for exhausting said quantity from said housing for scavenging purposes

8. A turbine-compressor assembly, according to claim 7, further including:
   a cooler, confined within said housing, having an inlet conduit for admitting gas therethrough to said stages, and an outlet conduit for conducting pressured gas therethrough from said stages.

9. A turbine-compressor assembly, according to claim 8, wherein:
   said inlet and outlet conduits are coaxially disposed.

10. A turbine-compressor assembly, according to claim 9, wherein:
   said outlet conduit defines a coolant chamber, and has a plurality of pipes extending therethrough for restrictively conducting said gas through said coolant chamber.

11. A turbine assembly, according to claim 9, wherein:
   said outlet conduit defines an annular coolant chamber, said chamber having coolant inlet and outlet means

12. A turbine-compressor assembly, according to claim 11, further including:
   control means for monitoring the r.p.m. of said shaft and means for regulating steam inlet volume with the occurrence of a deviation from optimum shaft r.p.m. limits.

13. A turbine-compressor assembly, according to claim 12, wherein:
   said control means include means for shutting down said assembly with the occurrence of excessive shaft excursion over selectively determined durations of time.

14. A turbine-compressor assembly, according to claim 13, wherein:
   said control means include means for monitoring the r.p.m. of said shaft and for shutting down said assembly with the occurrence of excessive shaft r.p.m.

15. A turbine-compressor assembly, according to claim 14, wherein:
   said control means include means for monitoring said dry lubricant bearing pressure and for shutting down said assembly with the departure of said bearing pressure from predetermined and acceptable parameters.

16. A turbine-compressor assembly, according to claim 15, wherein:
   said control means include means for monitoring gas pressure of said sealing means, and for shutting down said assembly with the occurrence of a gas pressure departure from predetermined and acceptable parameters.

17. A turbine-compressor assembly, according to claim 16, further including:
   means for admitting product gas to said cooler and compressor and for conducting product compressed gas therefrom, including means responsive to given outlet gas pressure for throttling both said gas admitting and conducting means and causing the compressed product gas to be reinserted into said compressor.

18. A turbine-compressor assembly, according to claim 1, further including means manifolding a plurality of said assemblies into a packaged system comprising a steam inlet conduit, a steam outlet conduit, and gas inlet and outlet conduits, wherein all said conduits are common to all assemblies of said plurality.